United States Patent
Cooper et al.

(10) Patent No.: US 7,542,451 B2
(45) Date of Patent: Jun. 2, 2009

(54) NETWORK OPERATOR IDENTIFICATION FOR CDMA COMMUNICATION NETWORKS

(75) Inventors: Rotem Cooper, San Diego, CA (US); Alejandro Holcman, San Diego, CA (US); Andrew T. Hunter, San Diego, CA (US); Edward G. Tiedemann, Concord, MA (US); Nobuyuki Uchida, San Diego, CA (US); Vera Kripalani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 10/607,966

(22) Filed: Jun. 27, 2003

(65) Prior Publication Data

US 2004/0236849 A1 Nov. 25, 2004

Related U.S. Application Data

(60) Provisional application No. 60/475,957, filed on Jun. 4, 2003, provisional application No. 60/472,013, filed on May 19, 2003.

(51) Int. Cl.
*H04B 7/216* (2006.01)

(52) U.S. Cl. .................. 370/335; 370/338; 370/331; 370/319; 455/452; 455/432.1; 455/432.2; 455/434; 455/435.2

(58) Field of Classification Search ............ 455/432.1, 455/432.2, 434, 435.2, 456.1, 433
See application file for complete search history.

(56) References Cited

U.S. PATENT DOCUMENTS 4,811,420 A * 3/1989 Avis et al. .................... 455/502

(Continued)

FOREIGN PATENT DOCUMENTS

EP 1239690 9/2002

(Continued)

OTHER PUBLICATIONS

Upper Layer (Layer 3) Signaling Standard for cdma2000 Spread Spectrum Systems Release C (2002) XP-002302863 TIA/EIA/IS-2000.5-C pp. 1-151.

(Continued)

*Primary Examiner*—Charles N Appiah
*Assistant Examiner*—Kwasi Karikari
(74) *Attorney, Agent, or Firm*—Kevin Cheatham; Darren M. Simon (57) ABSTRACT

A network operator identifier is used to uniquely identify each network operator to support international roaming. The network operator identifier includes (1) a Mobile Country Code (MCC) that identifies the country in which a network operator belongs and (2) a Network Operator Code (NOC), which may be a Mobile Network Code (MNC), that distinguishes network operators within a given MCC. Each network operator is assigned a unique combination of MCC and NOC that distinctly identifies the network operator, and the network operator identifier can be stored in a single entry in a preferred roaming list. The base stations of each network operator broadcast the network operator identifier in signaling messages. A mobile station receives a signaling message from a base station, obtains the network operator identifier, searches its preferred roaming list for an entry with the network operator identifier, and determines whether or not the current CDMA network is accessible.

8 Claims, 7 Drawing Sheets

U.S. PATENT DOCUMENTS

| | | | |
|---|---|---|---|
| 5,734,980 A * | 3/1998 | Hooper et al. | 455/434 |
| 5,905,953 A * | 5/1999 | Liu et al. | 455/433 |
| 6,047,071 A * | 4/2000 | Shah | 380/273 |
| 6,195,546 B1 * | 2/2001 | Leung et al. | 455/419 |
| 6,259,917 B1 * | 7/2001 | Elzein | 455/435.2 |
| 6,405,040 B1 | 6/2002 | Liu et al. | 455/435 |
| 6,529,491 B1 * | 3/2003 | Chang et al. | 370/335 |
| 6,556,820 B1 * | 4/2003 | Le et al. | 455/411 |
| 6,603,968 B2 * | 8/2003 | Anvekar et al. | 455/433 |
| 6,625,451 B1 * | 9/2003 | La Medica et al. | 455/434 |
| 6,819,918 B2 | 11/2004 | Chin et al. | |
| 7,072,651 B2 * | 7/2006 | Jiang et al. | 455/432.1 |
| 7,079,834 B2 * | 7/2006 | Kyung et al. | 455/410 |
| 7,096,014 B2 * | 8/2006 | Haverinen et al. | 455/432.1 |
| 2003/0016639 A1 * | 1/2003 | Kransmo et al. | 370/335 |
| 2003/0054809 A1 | 3/2003 | Bridges et al. | 455/419 |
| 2004/0005892 A1 * | 1/2004 | Mayer et al. | 455/432.1 |
| 2004/0160918 A1 * | 8/2004 | Narasimha | 370/335 |

FOREIGN PATENT DOCUMENTS

| | | |
|---|---|---|
| WO | 02103459 | 12/2002 |

OTHER PUBLICATIONS

Over-the-Air Service Provisioning of Mobile Stations in Spread Spectrum Standards (2002) XP-002315510 3GPP2 C.S0016-B V.1.0 pp. 30-C4.

3GPP2: International Implementation of Wireless Telecommunication Systems Compliant TIA/EIA-41 Revision: B. 3GPP2 N.S0017-B, Version 1.0.0, Dec. 2002.

International Search Report - PCT/US04/015629, International Search Authority - European Patent Office, Mar. 1, 2005.

Written Opinion - PCT/US04/015629, International Search Authority - European Patent Office, Mar. 1, 2005.

International Preliminary Report on Patentability - PCT/US04/015629, IPEA-US, Aug. 1, 2008.

* cited by examiner

SYSTEM TABLE

| | System (SID, NID) | Selection Preference | Roaming Indicator | Acquisition Index | |
|---|---|---|---|---|---|
| Permitted Systems 220 | 31100,4632 | First | Off | 0 | ←212a |
| | SID/NID | Second | On | 1 | |
| | SID/NID | Second | On | 2 | |
| | SID/NID | Third | Flashing | 4 | |
| Forbidden Systems 230 | SID/NID | - | - | - | |
| | 31101,44556 | - | - | - | ←212b |
| | SID/NID | - | - | - | |

Tabs: GEO L, GEO 3, GEO 2, GEO 1 (210x)

Flow 500:
- Start
- 512: Obtain MCC and NOC values for a network operator identifier that distinctly identifies a network operator
- 514: Map the MCC value to MCC field of *Extended System Parameters Message*
- 516: Map the NOC value to IMSI_11_12 field of *Extended System Parameters Message*
- 518: Process and transmit *Extended System Parameters Message*
- End

NETWORK OPERATOR IDENTIFICATION FOR CDMA COMMUNICATION NETWORKS

CROSS REFERENCE TO RELATED APPLICATIONS

This application claims the benefit of provisional U.S. Provisional Application Ser. No. 60/472,013, entitled "PRL Simplification for International Roaming," filed May 19, 2003, and U.S. Provisional Application Ser. No. 60/475,957, entitled "Network Operator Identification for CDMA Communication Networks" filed Jun. 4, 2003, assigned to the assignee of the present application.

BACKGROUND

1. Field

The present invention relates generally to communication, and more specifically to techniques for supporting roaming among CDMA communication networks.

2. Background

Wireless communication systems are widely deployed to provide various communication services such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may implement one or more CDMA standards such as IS-2000, IS-95, W-CDMA, and so on. A TDMA system may implement one or more TDMA standards such as Global System for Mobile Communications (GSM). These standards are well known in the art.

A network operator (i.e., a service provider or a "carrier") may deploy one or more wireless communication systems to provide services for its subscribers. Each deployed system covers a particular geographic region (e.g., a city) and may in turn include one or more smaller networks. For IS-95 and IS-2000, each system is identified by a system identification (SID) value, and each smaller network within a given system is identified by a network identification (NID) value.

For IS-95 and IS-2000, each mobile station maintains a preferred roaming list (PRL) that contains information to assist the mobile station perform system selection and acquisition. The preferred roaming list identifies "permitted" systems/networks that the mobile station can access and (optionally) "forbidden" systems/networks that the mobile station cannot access. These permitted and forbidden systems/networks are identified by their assigned (SID, NID) pairs in the preferred roaming list.

IS-95 and IS-2000 systems are widely deployed throughout the world. Operators of these systems in different countries may collaborate together in order to provide international roaming for their subscribers. However, international roaming is complicated by the manner in which the SID and NID and the preferred roaming list are currently maintained and used. In particular, there are several issues with respect to the preferred roaming list for international roaming. First, maintenance of the preferred roaming list for multiple network operators is cumbersome. Each network operator would need to collect network configuration information from its roaming partners in order to construct the preferred roaming lists for its own subscribers. The network configurations of each network operator continually evolve. If a network operator changes its network configurations (e.g., add or change a SID or a NID), then all of the roaming partners may need to update their preferred roaming lists accordingly based on the new configurations. PRL maintenance is thus complex and may discourage network operators from supporting international roaming. Second, the size of the preferred roaming list may be large for a large composite network formed with the systems of the roaming partners. The current design of the PRL allows a single (SID, NID) pair to be stored per entry. This PRL design requires a large number (e.g., hundreds) of entries to be present in the preferred roaming list for a large composite network with many (SID, NID) pairs. A large preferred roaming list may significantly impact memory requirements for a mobile station. Moreover, since the preferred roaming list may be sent to a mobile station via over-the-air signaling, a large preferred roaming list would also adversely impact download time.

There is therefore a need in the art for techniques for supporting international roaming and which address the PRL issues described above.

SUMMARY

Techniques for supporting international roaming with the current PRL design and which address the PRL issues described above are provided herein. These techniques use a network operator identifier to uniquely identify each network operator. The network operator identifier may be defined to include a Mobile Country Code (MCC) and a Network Operator Code (NOC). The NOC may be a Mobile Network Code (MNC) or some other code, as described below. The MCC identifies the country in which a network operator belongs. The NOC distinguishes network operators within a given MCC. Each network operator within a given MCC is assigned a unique NOC such that the combination of the MCC and NOC can distinctly identify the network operator. The network operator identifier for each network operator can be stored in a single entry in the preferred roaming list, as described below.

The base stations of each network operator broadcast the network operator identifier of their network operator in signaling messages. A mobile station receives a signaling message from a base station in a CDMA network, obtains the network operator identifier from the signaling message, and searches its preferred roaming list for an entry with the network operator identifier. The mobile station is able to determine whether or not the CDMA network is accessible based on the result of the search. If the network operator identifier is found in the preferred roaming list, then the mobile station can obtain the system parameters and/or priority for the CDMA network from the preferred roaming list and perform processing consistent with this information.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
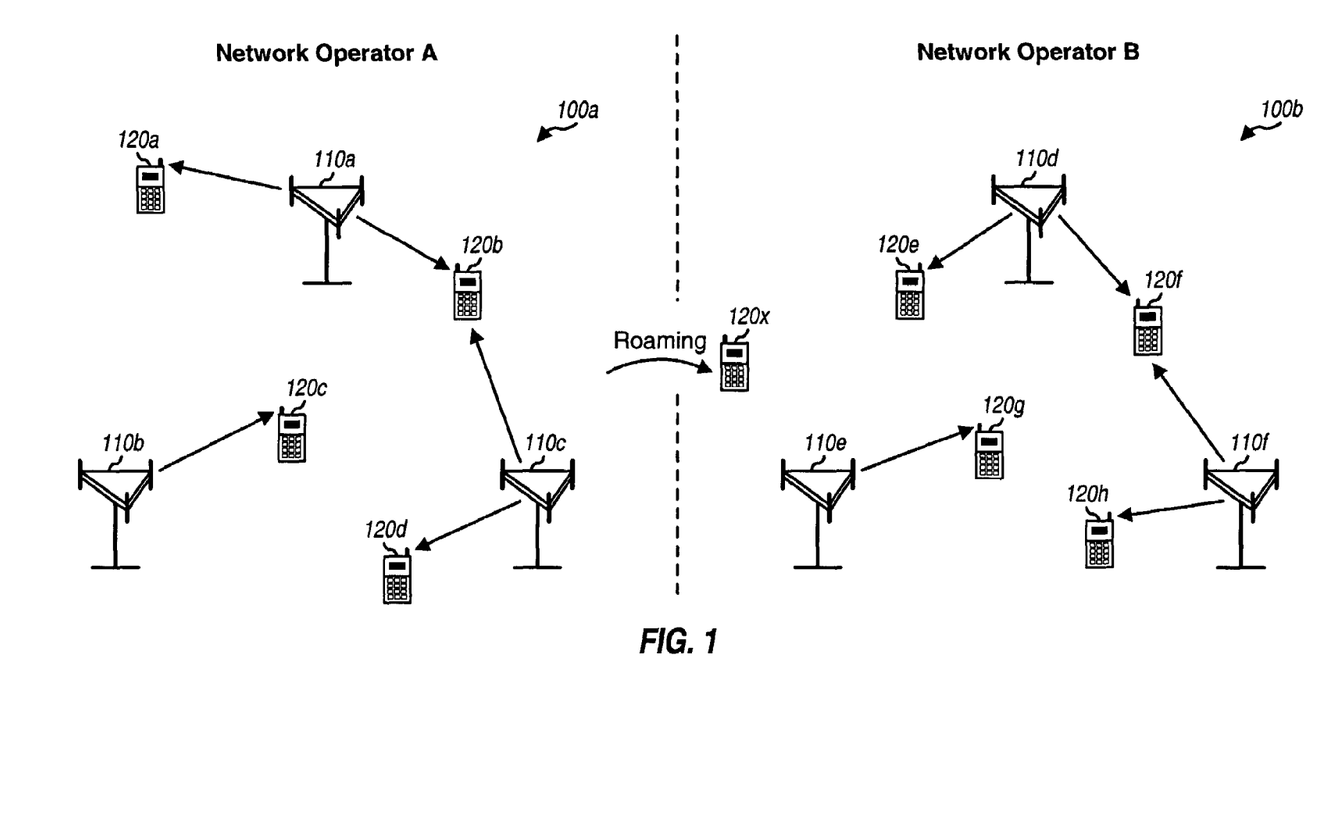
FIG. 1 shows two CDMA networks deployed in different geographic regions.

FIG. 1 shows a diagram of two CDMA networks 100a and 100b deployed in different geographic regions (e.g., different countries) and operated by two network operators A and B, respectively. Each CDMA network may be an IS-95 network, an IS-2000 network, or some other network. Each of CDMA networks 100a and 100b includes one or more systems, and each system further includes one or more smaller networks. Each system of CDMA networks 100a and 100b is identified by a SID value, and each smaller network of a given system is identified by a NID value. Each CDMA network typically includes many base stations 110 that support communication for mobile stations 120 within the coverage area of the CDMA network. For simplicity, only three base stations are shown in FIG. 1 for each CDMA network. A base station is a fixed station and may also be referred to as a base transceiver station (BTS), a Node B, an access point, or some other terminology. Mobile stations 120 are located throughout the coverage area of each CDMA network. A mobile station may be referred to as a remote station, a terminal, a mobile equipment (ME), a user equipment (UE), a wireless communication device, or some other terminology.

For IS-95 and IS-2000, each mobile station maintains a preferred roaming list that identifies permitted systems/networks that the mobile station can access and (optionally) forbidden systems/networks that the mobile station cannot access. The preferred roaming list may be programmed in a mobile station via a serial interface or sent to the mobile station via over-the-air signaling. Each mobile station stores its preferred roaming list in non-volatile memory so that the list is retained even when power is turned off. The non-volatile memory may be located within the mobile station or in a removable module that can be inserted into the mobile station.

Figure 2:
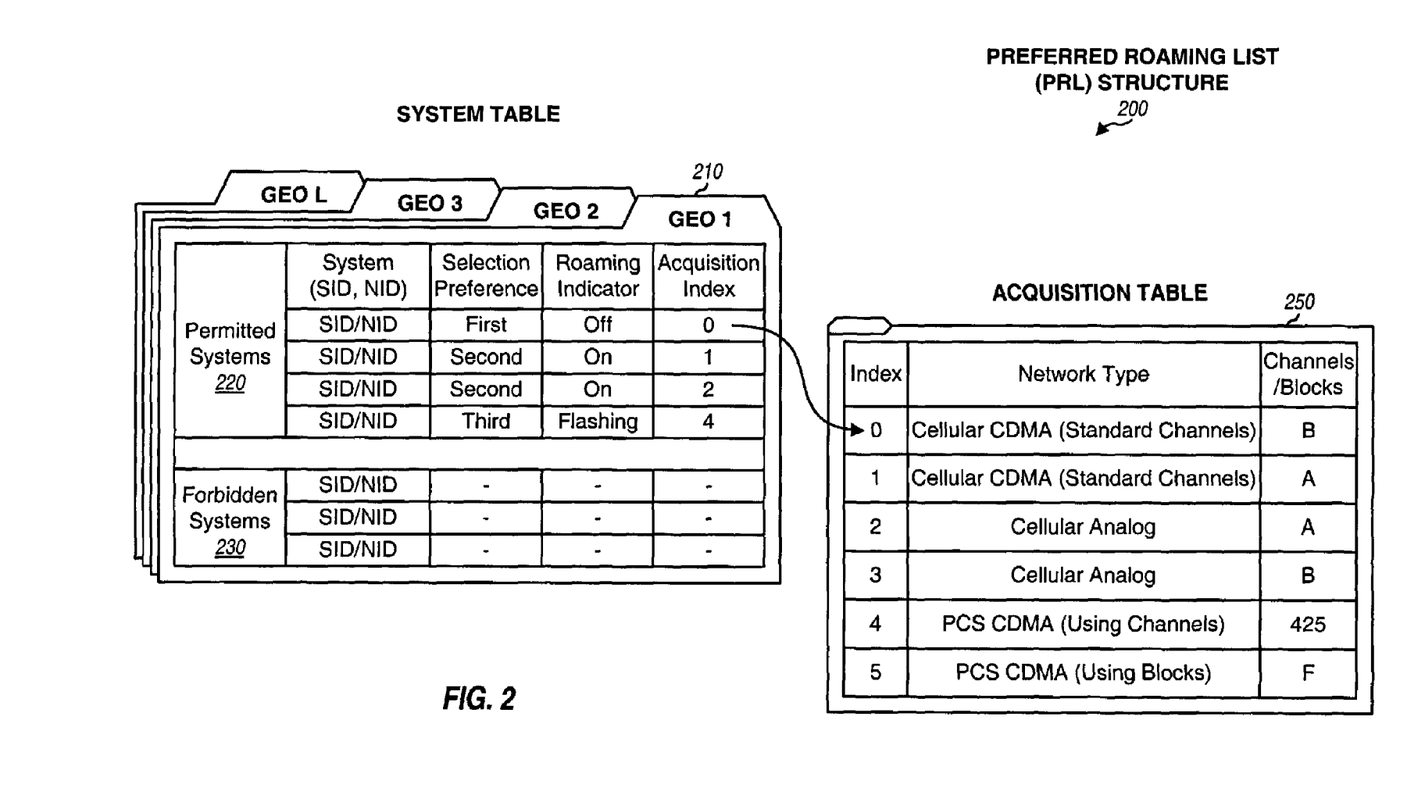
FIG. 2 shows a structure for the preferred roaming list as defined by TIA-683-C.

FIG. 2 shows a structure 200 for the preferred roaming list as currently defined by TIA-683-C and used in IS-95 and IS-2000. This PRL structure includes a system table 210 and an acquisition table 250. System table 210 includes a list of permitted and forbidden systems/networks, which is organized by geographic areas (GEOs). As shown in FIG. 2, a table is provided for each geographic area, and this table includes a section 220 for permitted or accessible systems/networks and a section 230 for forbidden or inaccessible systems/networks. The accessible systems/networks include systems/networks that the mobile station is allowed to access.

The table for each geographic area includes (1) an entry or record for each system/network present in the table and (2) multiple fields or columns for pertinent information for each entry. These fields include system (SID, NID) fields (which are shown as one combined field in FIG. 2 for simplicity), a selection preference field, a roaming indicator field, and an acquisition index field. For each entry, the system (SID, NID) fields store the (SID, NID) pair assigned to the system/network associated with that entry. The selection preference field indicates the preference for the associated system/network among all of the permitted systems/networks within the same geographic area. The network operator typically specifies the preference. The roaming indicator field includes a roaming indicator that is displayed by the mobile station when receiving a signal from the associated system/network. The acquisition index field includes an index value that points to a specific entry in acquisition table 250 containing the parameters to use to acquire the associated system/network.

Acquisition table 250 includes one entry for each unique index value and multiple fields for various parameters to use for system acquisition. The preferred roaming list is described in detail in a document TIA-683-C, entitled "Over-the-Air Service Provisioning of Mobile Stations in Spread Spectrum Systems," which is publicly available. TIA-683-C is also known as 3GPP2 C.S0016-B.

For IS-95 and IS-2000, each base station broadcasts the SID and NID values of the specific system/network to which the base station belongs. A mobile station can receive the (SID, NID) pair transmitted by a base station, search for the received (SID, NID) pair in the preferred roaming list, and operate in the most preferred system/network in an applicable GEO.

To support international roaming with the current PRL design as specified by TIA-683-C, many entries may be needed in the preferred roaming list to identify the systems/networks of a network operator as well as those of each of its roaming partners. These entries are used to aid acquisition and to prioritize the systems/networks of all of the network operators. A roaming partner may be a foreign network operator with a large CDMA network covering a large region and consisting of many (possibly hundreds) of (SID, NID) pairs. To store all of these (SID, NID) pairs in the preferred roaming list in order to support international roaming is undesirable for the reasons noted above.

To support international roaming with the current PRL design and avoid the need to store a large number of entries in the preferred roaming list, each network operator is uniquely identified by a network operator identifier. The network operator identifier for each network operator may be stored in a single entry in the system table. The base stations for each network operator broadcast the network operator identifier of their network operator. When roaming, a mobile station can ascertain whether or not a given system is accessible based on the network operator identifier received from a base station in the system and the preferred roaming list, as described below.

Figure 3:
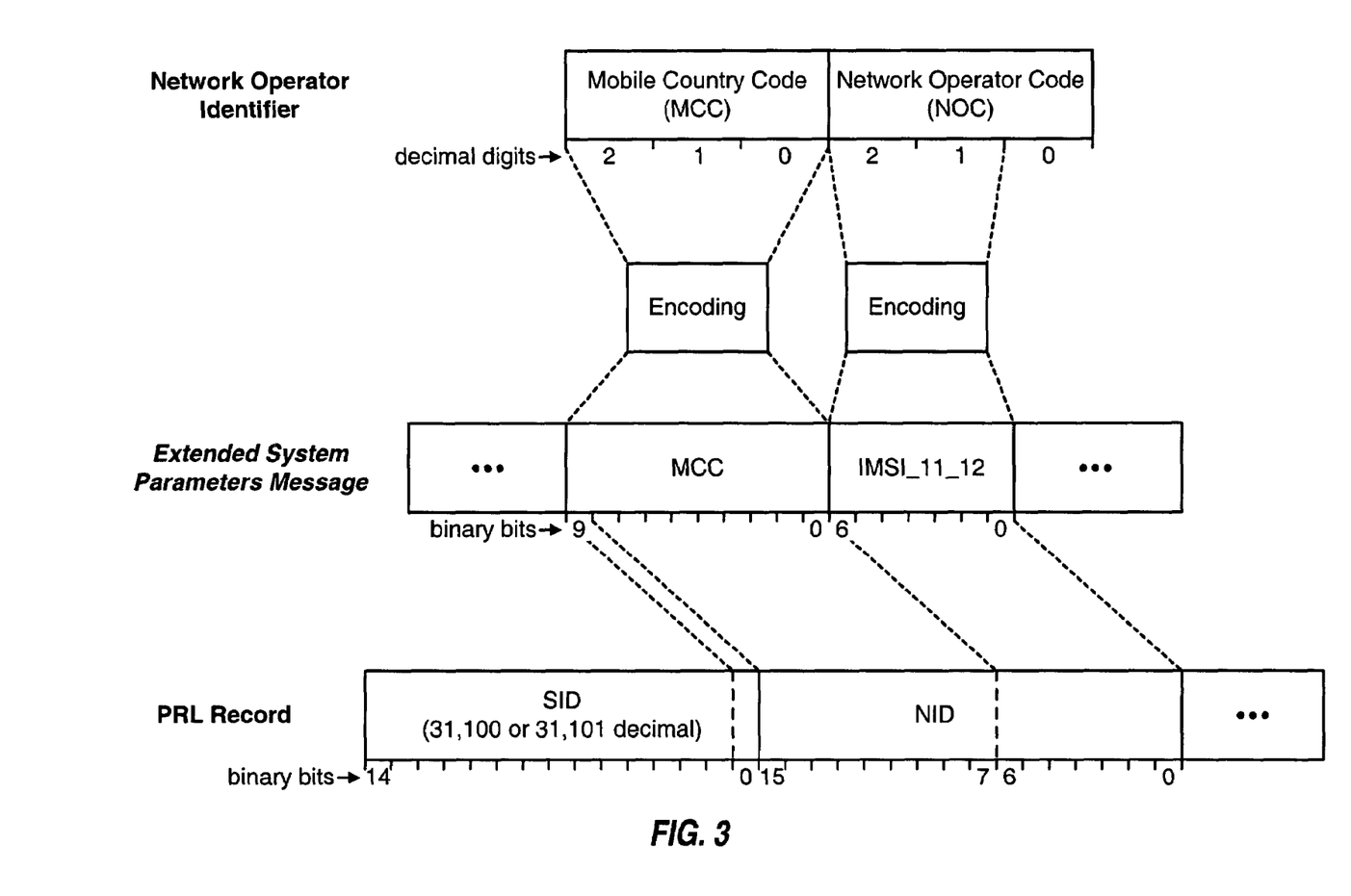
FIG. 3 shows the encapsulation of the network operator identifier in an Extended System Parameters Message defined by IS-2000 and the storage of the network operator identifier in a PRL record.

FIG. 3 shows an embodiment of the network operator identifier, which comprises the Mobile Country Code (MCC) and the Network Operator Code (NOC). The MCC is defined by the International Telecommunications Union (ITU) as a three-digit code that can identify the country in which a CDMA network is deployed. Each country is assigned one or more MCC values by the ITU in Recommendation E.212, which is publicly available. For example, the United States is assigned MCC values of 310 through 316.

The NOC may be defined as, for example, a two-digit code or a three-digit code (as shown in FIG. 3). In one embodiment, the NOC for the network operator identifier is the Mobile Network Code (MNC) defined by the ITU and used for an International Mobile Subscriber Identity (IMSI). In another embodiment, the NOC for the network operator identifier is defined without regard to the MNC of the ITU. The NOC can distinguish network operators within a given MCC value. A formal regulatory entity can administer and assign NOC values for each country. In the United States, Telcordia (http://www.imsiadmin.combination) has been selected to assign MNC values to GSM network operators. Telcordia has also assigned MNC values to some CDMA network operators, although the list is currently not comprehensive. Telcordia or another regulatory entity may assign NOC values to network operators in the United States. Each network operator within a given MCC value can be assigned a unique NOC value such that the combination of the MCC and NOC values can distinctly identify the network operator. The NOC values assigned to network operators only need to be unique for each MCC value and do not need to be unique across MCC values. Thus, each country can administer and assign NOC values without the need for coordination with other countries.

A large network operator (e.g., a multi-national operator) may operate multiple CDMA networks within different MCC values. In this case, the same or different NOC values may be assigned to the network operator for these CDMA networks. The network operator is then distinctly identified by multiple network operator identifiers, which are formed by multiple MCC values and either the same or different NOC values.

The network operator identifier may be sent in one or more signaling messages to the mobile stations. For example, the network operator identifier may be sent in a Sync Channel Message on a sync channel, a System Parameters Message on a paging channel, an Extended System Parameters Message on the paging channel, other existing or newly defined signaling messages in IS-95 and IS-2000, or any combination thereof.

FIG. 3 also shows the encapsulation of the network operator identifier in the Extended System Parameters Message defined by IS-95 and IS-2000. The Extended System Parameters Message has a number of fields, two of which are an MCC field and an IMSI_11_12 field. The MCC and IMSI_11_12 fields are mandatory fields and are included in each Extended System Parameters Message transmitted by a base station.

The 10-bit MCC field can carry the 3-digit MCC value for the network operator identifier. The encoding of the 3-digit MCC value into a 10-bit binary value for the MCC field is described in a document 3GPP2 C.S0005-C, entitled "Upper Layer (Layer 3) Signaling Standard for cdma2000 Spread Spectrum Systems," Section 2.3, which is publicly available. 3GPP2 C.S0005-C is also known as TIA/EIA/IS-2000.5-C.

The 7-bit IMSI_11_12 field can carry a 2-digit NOC value for the network operator identifier. If the NOC is defined as a 2-digit code, then the 2-digit NOC value for the network operator identifier can be carried in the IMSI_11_12 field in a straightforward manner. If the NOC is defined as a 3-digit code, then two digits of the 3-digit NOC value for the network operator identifier are carried in the IMSI_11_12 field. In an embodiment, the two most significant digits of the 3-digit NOC value are carried in the IMSI_11_12 field. The 3-digit NOC may be represented as nnA, where A is a fixed 1-digit value (e.g., A=0) for the least significant digit of the MCC and nn is a 2-digit value ranging from 0 through 99 for the two most significant digits of the MCC. The IMSI_11_12 field may then be set to nn. An "effective" NOC value refers to the NOC value carried in the IMSI_11_12 field. The effective NOC value may or may not be equal to the "true" NOC value assigned to the network operator, depending on whether the NOC is defined as a two or three digit code. The encoding of the 2-digit effective NOC value into a 7-bit binary value for the IMSI_11_12 field may be performed as described in the aforementioned 3GPP2 C.S0005-C, Section 2.3. The NOC value may also be encoded into the IMSI_11_12 binary value in some other manners (e.g., with straight decimal to binary conversion), and this is within the scope of the invention.

If the NOC is defined as a 3-digit code, then NOC values may be assigned to network operators in a manner to account for the broadcast of only two of the digits via the IMSI_11_12 field (e.g., with a fixed value for the A digit). In this case, if IS-95 and/or IS-2000 signaling interface and network entities are later updated to support a full 3-digit NOC, then the A digit may be changed to support additional sets of NOC values.

To support international roaming, the preferred roaming list can include an entry for the network operator identifier of each roaming partner. The network operator identifier can be stored, for example, in the (SID, NID) fields of the system table, as described below. The network operator identifier is stored in the preferred roaming list in a manner such that the following features are achieved:

Backward compatibility—entries for network operator identifiers of roaming partners should not interfere with the operation of conventional mobile stations that do not have the capability to process these network operator identifiers; and Forward compatibility—entries for network operator identifiers can be recognized and appropriately processed by upgraded mobile stations with the capability to process these network operator identifiers.

In an embodiment, the SID field in the system table is used to indicate whether a given record in the system table is for a network operator identifier or a conventional (SID, NID) pair. The NID field and a portion of the SID field in the system table are used to store the MCC and NOC values for the network operator identifier. In other embodiments, other fields in the system table may be used to indicate whether or not a given record in the system table is for a network operator identifier. For example, a NID Include field in the system table has two bits, and one of the four possible values for this field may be used to indicate whether or not a given record is for the network operator identifier. As another example, the Roaming Indicator field in the system table has eight bits, and one of the 256 possible values for this field may be used to indicate whether or not a given record is for the network operator identifier. Other fields in the system table may also be used to store the network operator identifier.

The SID field in the system table has a width of 15 bits. As specified by TSB29-D, which is also known as 3GPP2 N.S0017-A and is publicly available, SID values of 26,112 through 31,103 are excluded from assignment for system identification and SID values in six other ranges are reserved. To ensure backward compatibility, the SID values used for network operator identifiers cannot be the same as any of the SID values currently used by any network operator worldwide. In an embodiment, two SID values in the excluded SID range are used to indicate that a record in the system table is for a network operator identifier. In a specific embodiment, these two SID values are selected as 31,100 and 31,101, which are in the high end of the excluded SID range. However, other SID values from the excluded SID range, the reserved SID ranges, and possibly the assignable SID ranges may also be used to indicate a network operator identifier, and this is within the scope of the invention.

The NID field in the system table has a width of 16 bits. The MCC and NOC values for the network operator identifier can be encoded and stored in the NID and SID fields of a PRL record as described below.

FIG. 3 also shows a specific embodiment of the encoding and storage of a network operator identifier in the SID and NID fields of a PRL record. The MCC value and the effective NOC value for the network operator identifier are sent in the 10-bit MCC field and the 7-bit IMSI_11_12 field, respectively, of the Extended System Parameters Message. For the embodiment shown in FIG. 3, the 7-bit NOC value from the IMSI_11_12 field is stored in the 7 least significant bits (LSBs) (i.e., bits 0 through 6) of the NID field. The 10-bit MCC value from the MCC field is stored in the LSB (i.e., bit 0) of the SID field and the 9 most significant bits (MSBs) (i.e., bits 7 through 15) of the NID field. A decimal value of 15,550 is stored in the 14 MSBs (i.e., bits 1 through 14) of the SID field. The SID field would then have a decimal value of 31,100 if the MSB of the MCC value is '0', which is obtained from 15,550 for the 14 MSBs and '0' for the LSB of the SID field. The SID field would have a decimal value of 31,101 if the MSB of the MCC value is '1', which is obtained from 15,550 for the 14 MSBs and '1' for the LSB of the SID field The storage of the MCC and NOC values from the MCC and IMSI_11_12 fields into the SID and NID fields of a PRL record may be performed as follows. If the MSB of the MCC field is '0', then a value of 31,100 is stored in the SID field. The remaining 9 bits of the MCC field are stored in the 9 MSBs of the NID field, and the 7 bits of the IMSI_11_12 field are stored in the 7 LSBs of the NID field. If the MSB of the MCC field is '1', then a value of 31,101 is stored in the SID field. Again, the remaining 9 bits of the MCC field are stored in the 9 MSBs of the NID field, and the 7 bits of the IMSI_11_12 field are stored in the 7 LSBs of the NID field.

Figure 4:
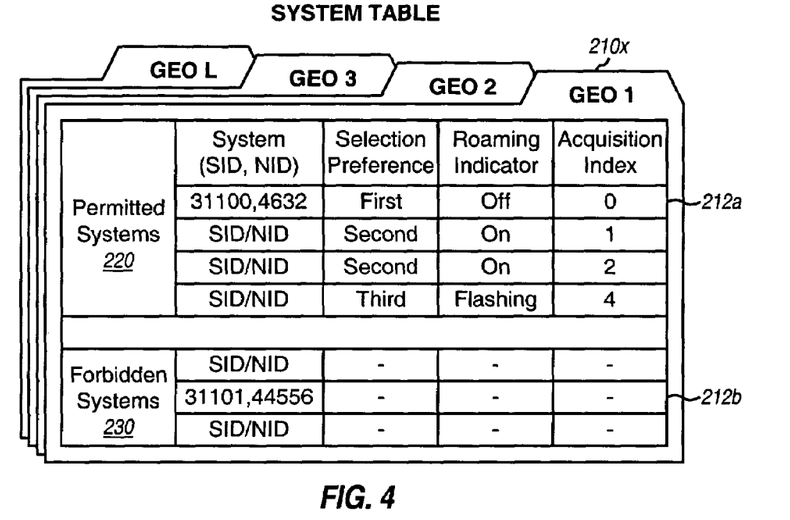
FIG. 4 shows an exemplary system table with two records for two network operator identifiers.

FIG. 4 shows an exemplary system table 210x with two records 212a and 212b for two network operator identifiers. Record 212a contains a network operator identifier for a permitted CDMA network and has a SID value of 31,100 and a NID value of 4632, which is '0001,0010,0001,1000' in binary. The MCC value for this CDMA network is '00,0010, 0100" binary or 147 decimal, and the effective NOC value for this CDMA network is '001,1000' binary or 35 decimal. Record 212b contains a network operator identifier for a forbidden CDMA network and has a SID value of 31,101 and a NID value of 44,556, which is '1010,1110,0000,1100' in binary. The MCC value for this CDMA network is '11,0101, 1100' binary or 971 decimal, and the effective NOC value for this CDMA network is '000,1100' binary or 23 decimal. The encoding of a decimal value of nn or nnn into a binary value is achieved by (1) forming an intermediate decimal value by replacing each decimal digit of zero (n=0), for nn or nnn, with a value of ten, (2) subtracting eleven (11) from the intermediate decimal value for nn or one hundred eleven (111) from the intermediate decimal value for nnn, and (3) converting the resultant decimal value to binary value. For example, the decimal value of 971 has a resultant decimal value of 971–111=860, which is converted to the binary value of '11,0101, 1100'. The encoding of decimal values into binary values for the MCC and IMSI_11_12 is described in the aforementioned 3GPP2 C.S0005-C, Section 2.3. The encoding of the MCC and NOC values for the MCC and IMSI_11_12 fields may be performed in other manners.

The MCC and NOC values for the network operator identifier may also be encoded and stored in a PRL record in some other manner, and this is within the scope of the invention. For example, a designated SID value (e.g., 31,110) may be used to indicate whether a PRL record is for a network operator identifier or a conventional (SID, NID) pair, and the MCC and NOC values for the network operator identifier may be encoded and stored in some other fields in the PRL record. The preferred roaming list may also be revised or defined to include one or more fields specifically for the network operator identifier. In this case, the network operator identifier can be stored in its own field(s) and does not need to be encoded into other fields.

As shown in FIG. 4, the new PRL record for a network operator identifier (e.g., records 212a and 212b) conforms to the format specified by TIA-683-C and has the same format as the PRL record for a conventional (SID, NID) pair. However, the new PRL record allows the MCC and NOC values for the network operator identifier to be encoded and used for identification of a network operator. Moreover, the new PRL record does not affect the conventional use of the preferred roaming list for system selection, as described below.

As shown in FIG. 4, the network operator identifier for a given network operator may be listed in permitted systems section 220 or forbidden systems section 230. A negative listing in section 230 may be used to prevent the mobile station from accessing the CDMA network of the network operator. The negatively listed CDMA network may be located in the same country as a home network or in a foreign country. The home network is identified in a home (SID, NID) list that is maintained by the mobile station separate from the preferred roaming list.

A network operator may be defined with different levels of granularity in the preferred roaming list. In one embodiment, a single PRL record for the network operator identifier of the network operator is stored in the preferred roaming list, and this record indicates whether access to the operator's CDMA network is permitted or forbidden. This single PRL record would cover the entire CDMA network of the network operator. In another embodiment, multiple PRL records for the network operator identifier and a list of (SID, NID) pairs are stored in the preferred roaming list for the network operator. This may be used, for example, in instances where most of the CDMA network is forbidden except for certain systems/networks of the CDMA network. In this case, a single PRL record with the network operator identifier may be stored in forbidden systems section 230 and PRL records for accessible (SID, NID) pairs may be stored in permitted systems section 220. A mobile station may attempt to match both the (SID, NID) pair and the network operator identifier received for the network operator. Since the (SID, NID) pair is more specific than the network operator identifier, higher priority may be given to a (SID, NID) match than a network operator identifier match, as described below. In yet another embodiment, PRL records for a list of (SID, NID) pairs may be stored in the preferred roaming list to indicate permitted systems/networks and/or forbidden systems/networks of the network operator.

Each base station in a CDMA network may broadcast the network operator identifier via the Sync Channel Message, the System Parameters Message, the Extended System Parameters Message, other signaling messages, or any combination thereof. For clarity, the following description for FIGS. 5 and 6 assumes that the network operator identifier is only sent via the Extended System Parameters Message unless otherwise noted. The mobile stations in the CDMA network can receive the Extended System Parameters Message from a base station, obtain the MCC and NOC values sent in the MCC and IMSI_11_12 fields, and identify the network operator based on these MCC and NOC values.

Figure 5:
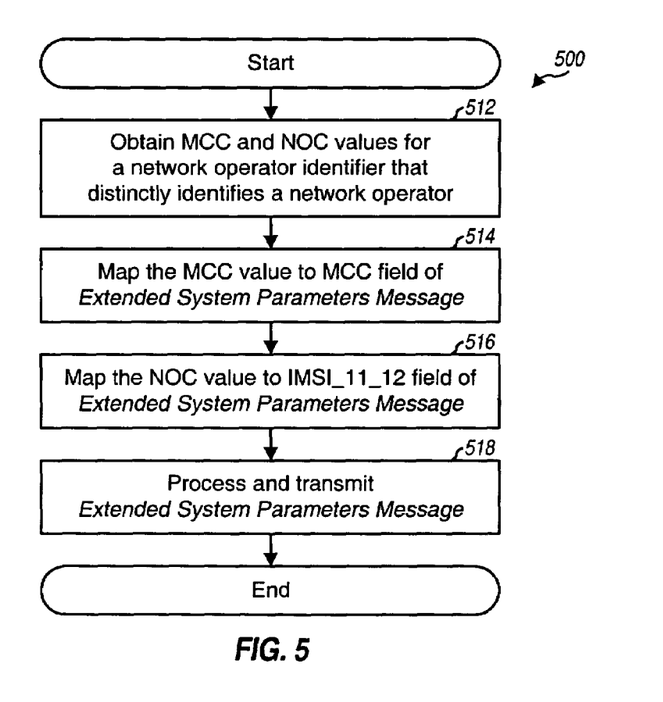
FIG. 5 shows a process for transmitting a network operator identifier by a base station.

FIG. 5 shows a flow diagram of a process 500 for transmitting a network operator identifier by a base station in a CDMA network. Initially, the MCC and NOC values for the network operator identifier that distinctly identifies the network operator of the CDMA network are obtained (step 512). The MCC value is mapped to the MCC field of the Extended System Parameters Message (step 514). The NOC value (e.g., the 2 most significant digits of a 3-digit NOC value) is mapped to the IMSI_11_12 field of the Extended System Parameters Message (step 516). The Extended System Parameters Message is then processed and transmitted from the base station via the forward link (step 518).

A mobile station performs system selection to determine the best system to receive service. System selection may be performed at power-on, at the start of a call, at the end of a call, when signal is lost, for periodic cell reselection, and so on. The best system is determined based on (1) the priority and preference indicated for the systems/networks in the preferred roaming list and (2) the rules applicable for the preferred roaming list. For system selection, the mobile station first receives the Sync Channel Message sent on the sync channel by a base station in a current system. This message contains various pieces of information, including the SID and NID values of the current system. The mobile station then receives the System Parameters Message and/or Extended System Parameters Message sent on the paging channel. The System Parameters Message also carries the SID and NID values of the current system along with other pertinent information (e.g., the MCC and NOC values for the network operator). The Extended System Parameters Message carries the MCC and NOC values for the network operator in the MCC and IMSI_11_12 fields, as described above.

In one embodiment, the mobile station performs system selection upon receiving the Sync Channel Message and attempts to match the received (SID, NID) pair for the current system against the (SID, NID) pairs stored in the preferred roaming list. If there is no match, then the mobile station attempts to match the network operator identifier upon receiving the Extended System Parameters Message. In another embodiment, the mobile station performs system selection after receiving the Extended System Parameters Message and attempts to match the received (SID, NID) pair and/or the network operator identifier for the current system. In yet another embodiment whereby the network operator identifier is sent in the Sync Channel Message, the mobile station performs system selection after receiving the Sync Channel Message and attempts to match the received (SID, NID) pair and/or the network operator identifier for the current system. For all embodiments, the mobile station attempts to match the (SID, NID) pair for the current system prior to matching the network operator identifier (if necessary), as described below.

Figure 6:
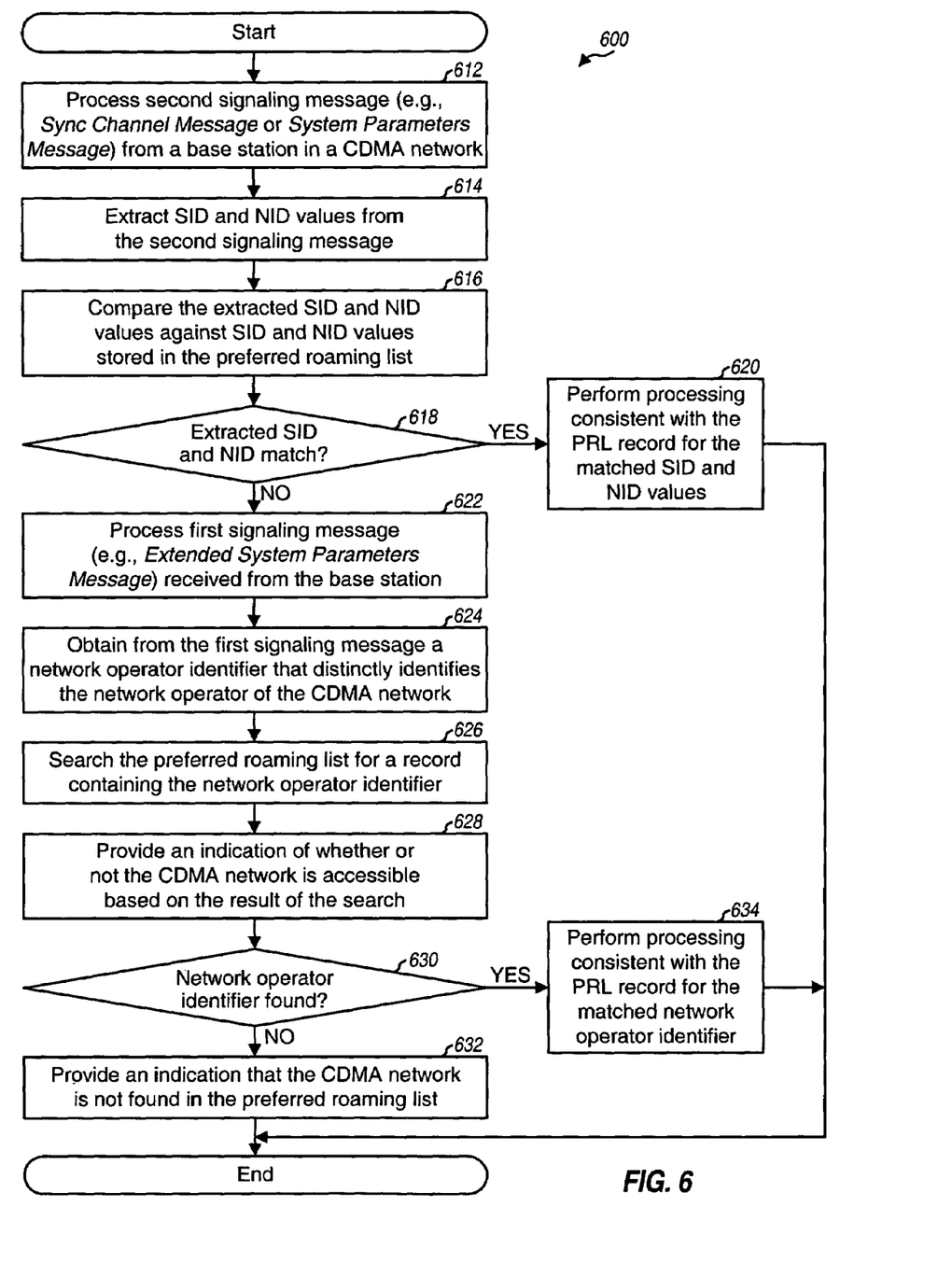
FIG. 6 shows a process for performing system selection by a mobile station.

FIG. 6 shows a flow diagram of a process 600 for performing system selection by a mobile station in a CDMA network. For this embodiment, the system selection is performed based on (1) a first signaling message that contains the network operator identifier for the network operator of the CDMA network and (2) a second signaling message that contains the (SID, NID) pair for the system/network from which the mobile station currently receives a signal.

Initially, the second signaling message is received from a base station in the CDMA network and processed (step 612). A SID value and a NID value are extracted from the second signaling message (step 614) and compared against the SID and NID values stored in the preferred roaming list for the mobile station (step 616). A determination is then made whether or not the extracted SID and NID values match any of the SID and NID values stored in the preferred roaming list (step 618). If the answer is 'yes', then the mobile station performs processing consistent with the PRL record for the matched SID and NID values (step 620) and the process thereafter terminates.

If the extracted SID and NID values do not match any of the SID and NID values stored in the preferred roaming list (i.e., the answer is 'no' for step 618), then the first signaling message received from the base station is processed (step 622). A network operator identifier that distinctly identifies the network operator of the CDMA network is obtained from the first signaling message (step 624). The preferred roaming list is then searched to find a record containing the network operator identifier (step 626). Step 626 may be performed by first encoding the network operator identifier into a SID value and a NID value, as described above. The encoded SID and NID values are then compared against the SID and NID values stored in the preferred roaming list. An indication of whether or not the CDMA network is accessible to the mobile station is provided based on the result of the search (step 628).

If there is no match in the preferred roaming list for the network operator identifier, as determined in step 630, then the mobile station may display a message that the CDMA network is not found in the preferred roaming list (step 632) and the process thereafter terminates. Alternatively, if there is a match in the preferred roaming list for the network operator identifier, then the mobile station performs processing consistent with the PRL record for the matched network operator identifier. This PRL record may include various pieces of information indicating (1) whether the CDMA network is permitted or forbidden, (2) the roaming indicator, (3) the priority of the CDMA network within a given geographic area, and so on. Existing rules and features for PRL records for conventional (SID, NID) pairs may be applied to PRL records for network operator identifiers. The PRL record for the network operator identifier may indicate that the CDMA network is accessible or inaccessible.

For IS-95 and IS-2000, the second signaling message may be the Sync Channel Message or the System Parameters Message and the first signaling message may be the Extended System Parameters Message. The first and second signaling messages may also be a single message (e.g., the Sync Channel Message or the System Parameters Message that carries both the (SID, NID) pair and network operator identifier. The network operator identifier comprises an MCC value and an NOC value, which may be obtained from the MCC field and the IMSI_11_12 field, respectively, of the Extended System Parameters Message. If the NOC is a 3-digit value, then the 2 most significant digits may be sent in the IMSI_11_12 field. The MCC and NOC values are encoded into SID and NID values for comparison against the (SID, NID) entries in the preferred roaming list. The encoded SID value falls within a range of values excluded from assignment to network operators for system identification (e.g., the encoded SID may fall within the range of 26,112 to 31,103).

Process 600 performs system selection by matching against a combination of (SID, NID) entries and (MCC, NOC) entries in the preferred roaming list. Other processes may also be implemented for system selection, and this is within the scope of the invention. For example, a process may be defined whereby a mobile station first attempts to match the received MCC and NOC values, and thereafter attempts to match the received SID and NID values if the MCC and NOC values are not found. This may be used, for example, to quickly identify a forbidden CDMA network without having to search through the entire preferred roaming list. As another example, the matching of (SID, NID) entries may be performed by one process, and the matching of (MCC, NOC) entries may be performed by another process.

The use of special SID values (e.g., SID values in the excluded range) to indicate network operator identifiers provides various advantages, some of which are enumerated below.

First, backward compatibility is achieved for conventional mobile stations not capable of processing the network operator identifiers. The operation of these conventional mobile stations is not affected by entries in the preferred roaming list for network operator identifiers of roaming partners. A conventional mobile station performing system selection would try to match the received SID and NID values, which are obtained from either the Sync Channel Message or the System Parameters Message, against those stored in the preferred roaming list. Since the SID values for network operator identifiers are in the excluded range, there would never be a match of the received (SID, NID) pair to any of the (SID, NED) pairs for the network operator identifiers. The PRL entries for the network operator identifiers would have no effect on system selection by the conventional mobile station. The behavior of the preferred roaming list with respect to entries for conventional (SID, NID) pairs is not changed. A network operator may thus continue to program and use (SID, NID) pairs in the preferred roaming list to influence system selection by conventional mobile stations.

Second, the preferred roaming list may be updated in the normal manner by an Over-the-Air Service Provisioning Function (OTAF). The OTAF is a function on the network side responsible for service provisioning and parameter administration. The OTAF may invoke and control an Over-the-Air Parameter Service Provisioning (OTASP) and an Over-the-Air Parameter Administration (OTAPA) functionality and messaging protocol to update the preferred roaming list of a mobile station. TIA-683-C defines the procedures and messaging protocols used between the OTAF and the mobile station for OTASP/OTAPA. To form a preferred roaming list for download to a mobile station, each network operator identifier can be encoded into a (SID, NID) pair and stored along with other information in a PRL record. The OTAF can treat the (SID, NID) pair for the network operator identifier in the same manner as a conventional (SID, NID) pair for a permitted or forbidden system/network. The PRL structure with all of the PRL records is then bit packed, encoded, and sent to the mobile station via one or more instances of a Data Burst Message. The mobile station can receive the Data Burst Message transmissions, retrieve the roaming list information, and generate the preferred roaming list. The mobile station can treat PRL records for network operator identifiers in the same manner as PRL records for conventional (SID, NID) pairs for permitted and forbidden systems/networks.

A network operator may maintain a single instance of roaming list information with both records for conventional (SID, NID) pairs and records for network operator identifiers. This roaming list information may be sent to all mobile stations, i.e., conventional and upgraded mobile stations. The records for network operator identifiers do not affect the operation of conventional mobile stations, as described above. The records for network operator identifiers may be used by upgraded mobile stations for system selection, as also described above. Maintenance of roaming list information is greatly simplified for the network operator.

Figure 7:
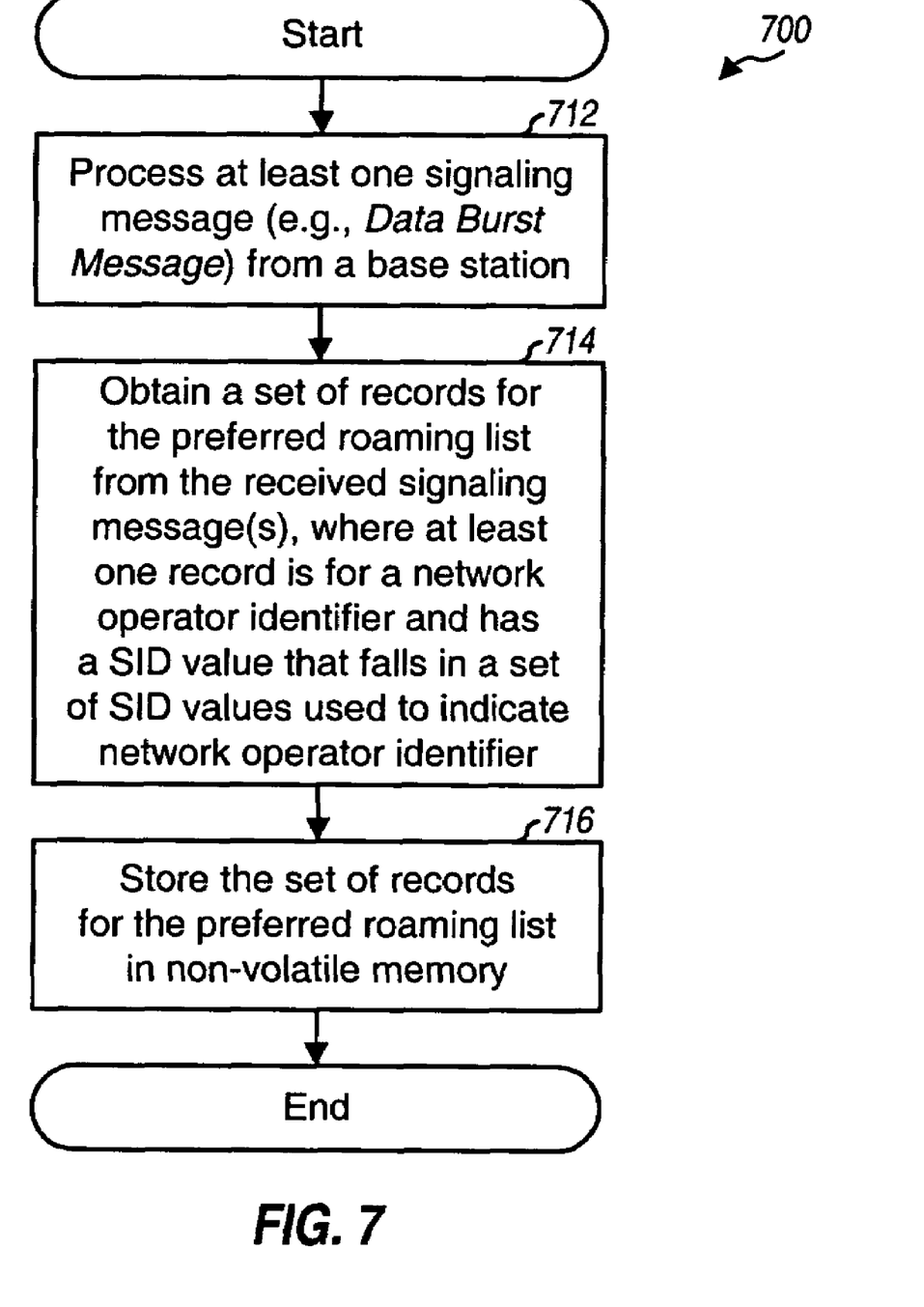
FIG. 7 shows a process for updating the preferred roaming list of the mobile station.

FIG. 7 shows a flow diagram of a process 700 for updating a preferred roaming list of a mobile station. Initially, at least one signaling message (e.g., Data Burst Message) is received from a base station and processed (step 712). A set of records for the preferred roaming list is obtained from the received message(s) (step 714). At least one PRL record in the set has a SID value that is within a set of SID values used to indicate that the record is for a network operator identifier. This set of SID values may fall within a range of 26,112 to 31,103. For each such PRL record, the SID and NID fields of the record carry a network operator identifier that distinctly identifies the network operator of a CDMA network. The set of records for the preferred roaming list is stored in non-volatile memory, which may be located within the mobile station or in a removable module (step 716).

Another process complementary to process 700 is performed at a network entity to send roaming list information to the mobile station. The processing at the network entity and the mobile station for provisioning the mobile station with the preferred roaming list is described in TIA-683-C.

Figure 8:
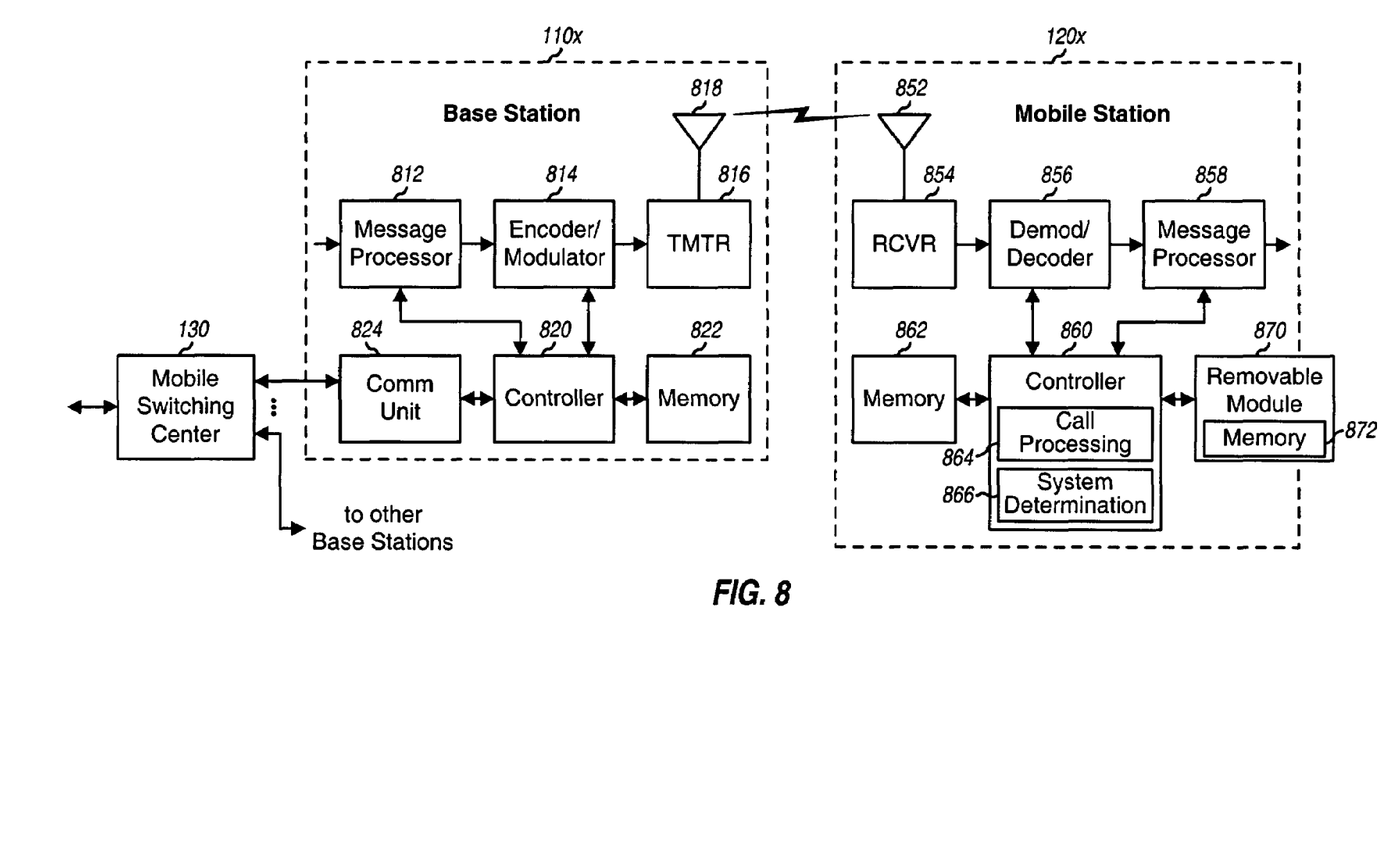
FIG. 8 shows a block diagram of the base station and the mobile station.

FIG. 8 shows a block diagram of a base station 110x and mobile station 120x. Base station 110x is one of the base stations in FIG. 1. Base station 110x is also part of a system/network that is identified by a specific (SID, NID) pair and further belongs to a network operator that is identified by a specific network operator identifier.

At base station 110x, a message processor 812 receives data from various applications and generates messages. Message processor 812 includes the (SID, NID) pair for the system/network in the appropriate signaling messages (e.g., the Sync Channel Message and System Parameters Message). Message processor 812 also includes the MCC and NOC values for the network operator identifier in the MCC and IMSI_11_12 fields, respectively, of the System Parameters Message or Extended System Parameters Message. An encoder/modulator 814 receives, formats, encodes, interleaves, and modulates the messages in accordance with the (e.g., IS-2000 physical layer) processing scheme specified for each code channel. Encoder/modulator 814 provides modulated data to a transmitter unit (TMTR) 816, which processes and conditions the modulated data to obtain a modulated signal. The modulated signal is then transmitted via an antenna 818 to the mobile stations within the coverage area of base station 110x.

At mobile station 120x, the modulated signal transmitted by base station 110x is received by an antenna 852 and provided to a receiver unit (RCVR) 854. Receiver unit 854 conditions and digitizes the received signal to obtain samples. A demodulator (Demod)/decoder 856 then demodulates, deinterleaves, and decodes the samples (e.g., based on IS-2000 physical layer processing) to obtain decoded data. A message processor 858 processes the decoded data to recover the signaling messages transmitted by base station 110x.

Controllers 820 and 860 direct the operation of base station 110x and mobile station 120x, respectively. Memory units 822 and 862 provide storage for program codes and data used by controllers 820 and 860, respectively. A communication (Comm) unit 824 supports communication between base station 110x and a mobile switching center (MSC) 130. MSC 130 couples to multiple base stations, provides coordination and control for these base stations, and further controls the routing of data to/from the mobile stations served by these base stations. MSC 130 further couples to other network entities (e.g., a network entity that implements the OTAF).

Controller 860 may implement a call processing function 864 and a system determination function 866. Call processing function 864 receives the recovered signaling messages, extracts the SID and NID values from the Sync Channel Message and/or System Parameters Message, obtains the MCC and NOC values from the MCC and IMSI_11_12 fields of the System Parameters Message or Extended System Parameters Message, and provides the extracted SID and NID values and MCC and NOC values to system determination function 866. System determination function 866 may implement process 600 to determine whether or not the current system is accessible and, if yes, the parameter values to use to access the system.

The preferred roaming list for mobile station 120x may be downloaded and updated via over-the-air messages. To download the preferred roaming list, the OTAF residing in a network-side entity generates PRL records for network operator identifiers and/or (SID, NID) pairs and encapsulates the roaming list information into one or more instances of the Data Burst Message. These signaling messages are then processed by base station 110x and transmitted to mobile station 120x. At mobile station 120x, message processor 858 extracts the roaming list information from the recovered instances of Data Burst Message, constructs the preferred roaming list based on the extracted information, and provides the preferred roaming list to memory unit 862 and/or a removable module 870. The preferred roaming list is stored in non-volatile memory (e.g., a memory unit 872 within removable module 870) so that it is retained even when power is turned off. Removable module 870 may be a Removable User Identity Module (R-UIM) defined by IS-2000 or some other types of module that may be defined by some other standards.

In the above description, one network operator identifier is assigned to each network operator and used to distinctly identify that operator. It is also possible to assign multiple network operator identifiers to a given network operator (e.g., similar to the assignment of multiple MCC values to a given country). The multiple network operator identifiers may be used, for example, to identify CDMA networks in different regions belonging to the same network operator. The network operator may use multiple network operator identifiers to support different roaming agreements and/or alliances for different regions or for other purposes. The number of network operator identifiers assigned to each network operator should be kept small to simplify maintenance of the preferred roaming lists for the mobile stations.

The network operator identifier may be used to support international roaming, as described above. The network operator identifier may also be used for other purposes. One such alternate use is for simplification of the preferred roaming list. For example, a network operator may be defined by a single PRL record for the network operator identifier and a smaller number of PRL records for the (SID, NID) pairs for permitted systems/networks, as described above.

For clarity, the network operator identifier and its implementation and use have been specifically described for IS-95 and IS-2000. The techniques described herein may also be used for other wireless communication systems (e.g., TDMA systems, FDMA system, and other CDMA systems).

The techniques described herein for using network operator identifiers to support roaming and other uses may be implemented by various means. For example, these techniques may be implemented in hardware, software, or a combination thereof. For a hardware implementation, the processing units used at a mobile station, a base station, and other network entities to implement the techniques described herein may be formed within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented by a mobile station, a base station, and other network entities with modules (e.g., procedures, functions, and so on) that perform the functions described herein. The software codes may be stored in a memory unit (e.g., memory units 822 and/or 862 in FIG. 8) and executed by a processor (e.g., controllers 820 and/or 860). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing system selection in a code division multiple access (CDMA) communication network, comprising:

processing a System Parameters Message or an Extended System Parameters Message received from a base station in the CDMA network;

obtaining a mobile country code (MCC) value and a network operator code (NOC) value from an MCC field and an IMSI_11_12 field, respectively, of the System Parameters Message or the Extended System Parameters Message, wherein the MCC and NOC values form a network operator identifier (NOI) that distinctly identifies a network operator of the CDMA network;

encoding the MCC and NOC values into a system identification (SID) value and a network identification (NID) value;

comparing the encoded SID and NID values against values stored in SID and NID fields of a preferred roaming list; and providing an indication of whether or not the CDMA network is accessible based on result of the searching.

2. The method of claim 1, further comprising:

extracting a SID value and a NID value from a Sync Channel Message or the System Parameters Message received from the base station;

comparing the extracted SID and NID values against the values stored in the SID and NID fields of the preferred roaming list; and performing the obtaining, encoding, comparing, and providing only if the extracted SD and NID values do not match the values stored in the preferred roaming list.

3. An apparatus in a code division multiple access (CDMA) communication network, comprising:

a message processor operative to process at least one signaling message received from a base station in the CDMA network;

a controller operative to obtain a set of records for a preferred roaming list from the at least one signaling message, wherein at least one record in the set of records has a system identification (SID) value that is in a set of SID values used to indicate network operator identifiers (NOIs), and wherein each of the at least one record includes a network operator identifier (NOI) that distinctly identifies a network operator of a CDMA network; and a memory unit operative to store the set of records for the preferred roaming list.

4. The apparatus of claim 3, wherein the set of SID values used to indicate NOIs is within a range of 26,112 to 31,103.

5. An apparatus in a code division multiple access (CDMA) communication network, comprising:

a message processor operative to map a mobile country code (MCC) value and a network operator code (NOC) value for a network operator identifier (NOI) to an MCC field and an IMSI_11_12 field, respectively, of a System Parameters Message or an Extended System Parameters Message, wherein the NOI distinctly identifies a network operator of the CDMA network; and an encoder/modulator operative to process the System Parameters Message or the Extended System Parameters Message for transmission over a wireless link, wherein the encoder encodes the MCC and NOC values for storage in a system identification (SID) value field and a network identification (NID) value field of a preferred roaming list.

6. The apparatus of claim 5, wherein the network operator code is a mobile network code (MNC).

7. A method of transmitting a network operator identifier (NOI) in a code division multiple access (CDMA) communication network, comprising:

mapping a mobile country code (MCC) value for the NOI to an MCC field of a System Parameters Message or an Extended System Parameters Message; mapping a network operator code (NOC) value for the NOI to an IMSI_11_12 field of the System Parameters Message or the Extended System Parameters Message, wherein the NOI distinctly identifies a network operator of the CDMA network;

encoding the MCC and NOC values for storage in a system identification (SID) value field and a network identification (NID) value field of a preferred roaming list; and processing the System Parameters Message or the Extended System Parameters Message for transmission over a wireless link.

8. An apparatus in a code division multiple access (CDMA) communication network, comprising:

means for mapping a mobile country code (MCC) value for a network operator identifier (NOI) to an MCC field of a System Parameters Message or an Extended System Parameters Message;

means for mapping a network operator code (NOC) value for the NOI to an IMSI_11_12 field of the System Parameters Message or the Extended System Parameters Message, wherein the NOI distinctly identifies a network operator of the CDMA network;

means for encoding the MCC and NOC values for storage in a system identification (SID) value field and a network identification (NID) value field of a preferred roaming list; and means for processing the System Parameters Message or the Extended System Parameters Message for transmission over a wireless link.

* * * * *

UNITED STATES PATENT AND TRADEMARK OFFICE
CERTIFICATE OF CORRECTION

| | | |
|---|---|---|
| PATENT NO. | : 7,542,451 B2 | Page 1 of 1 |
| APPLICATION NO. | : 10/607966 | |
| DATED | : June 2, 2009 | |
| INVENTOR(S) | : Cooper et al. | |

It is certified that error appears in the above-identified patent and that said Letters Patent is hereby corrected as shown below:

Column 14, line 48, claim 2: "SD" to read as --SID--

Signed and Sealed this
Twenty-first Day of June, 2011

David J. Kappos
*Director of the United States Patent and Trademark Office*